United States Patent [19]

Witman

[11] 4,068,030
[45] Jan. 10, 1978

[54] MULTILEVEL EMBOSSING BY PRINTING WITH A REACTIVE MONOMER

[75] Inventor: Jack H. Witman, Lancaster, Pa.

[73] Assignee: Armstrong Cork Company, Lancaster, Pa.

[21] Appl. No.: 439,144

[22] Filed: Feb. 4, 1974

Related U.S. Application Data

[63] Continuation-in-part of Ser. No. 272,851, July 18, 1972, abandoned.

[51] Int. Cl.² .................. B32B 3/12; B32B 3/26; B05D 5/00
[52] U.S. Cl. .................. 428/159; 428/172; 428/195; 428/207; 428/147; 428/215; 428/163; 428/170; 427/210; 427/261; 427/197; 427/201; 156/77; 156/277; 264/54
[58] Field of Search .............. 428/159, 172, 195, 207; 161/5, 116, 164, 165, 413; 117/21, 12; 156/77, 277

[56] References Cited

U.S. PATENT DOCUMENTS

| | | | |
|---|---|---|---|
| 592,186 | 10/1897 | Bedford | 156/238 |
| 2,618,580 | 11/1952 | Lancaster | 156/77 X |
| 3,042,137 | 7/1962 | Mathues et al. | 180/90 |
| 3,359,352 | 12/1967 | Powell et al. | 156/77 X |
| 3,365,353 | 1/1968 | Witman | 117/11 X |
| 3,442,742 | 5/1969 | Jorgensen | 156/277 X |
| 3,538,204 | 11/1970 | Grubb et al. | 264/54 |
| 3,778,291 | 12/1973 | Elliott et al. | 156/77 X |
| 3,804,657 | 4/1974 | Eyman et al. | 117/21 X |

*Primary Examiner*—P. C. Ives

[57] ABSTRACT

An improvement in the process for producing a decorative surface covering having a multilevel embossed wear surface wherein, a layer of vinyl chloride resin dryblend which may be foamable or unfoamable, and which contains a polymerizable monomer having at least two olefinically unsaturated sites is formed. After sintering to achieve a solid but porous layer having substantial voids throughout, a plurality of resinous ink compositions, formulated to produce varying degrees of elevation in the final product, are applied in a design. Among the inks used are non-monomer-containing ink compositions which may include foamable and non-foamable inks and which may or may not include a catalyst for the monomer in the dryblend. The improvement of this invention comprises the inclusion in the plurality of inks printed in a design on the monomer-containing dryblend layer of an ink containing the same polymerizable monomer as that in the dryblend, and a catalyst for the monomer. Upon subsequent heat and fusion, the areas to which the inks containing the monomer and/or the catalyst for the monomer were applied will have a different height and surface texture from those produced by the other inks and from that of surrounding regions where no ink was applied; thus producing an embossed textured effect.

17 Claims, 5 Drawing Figures

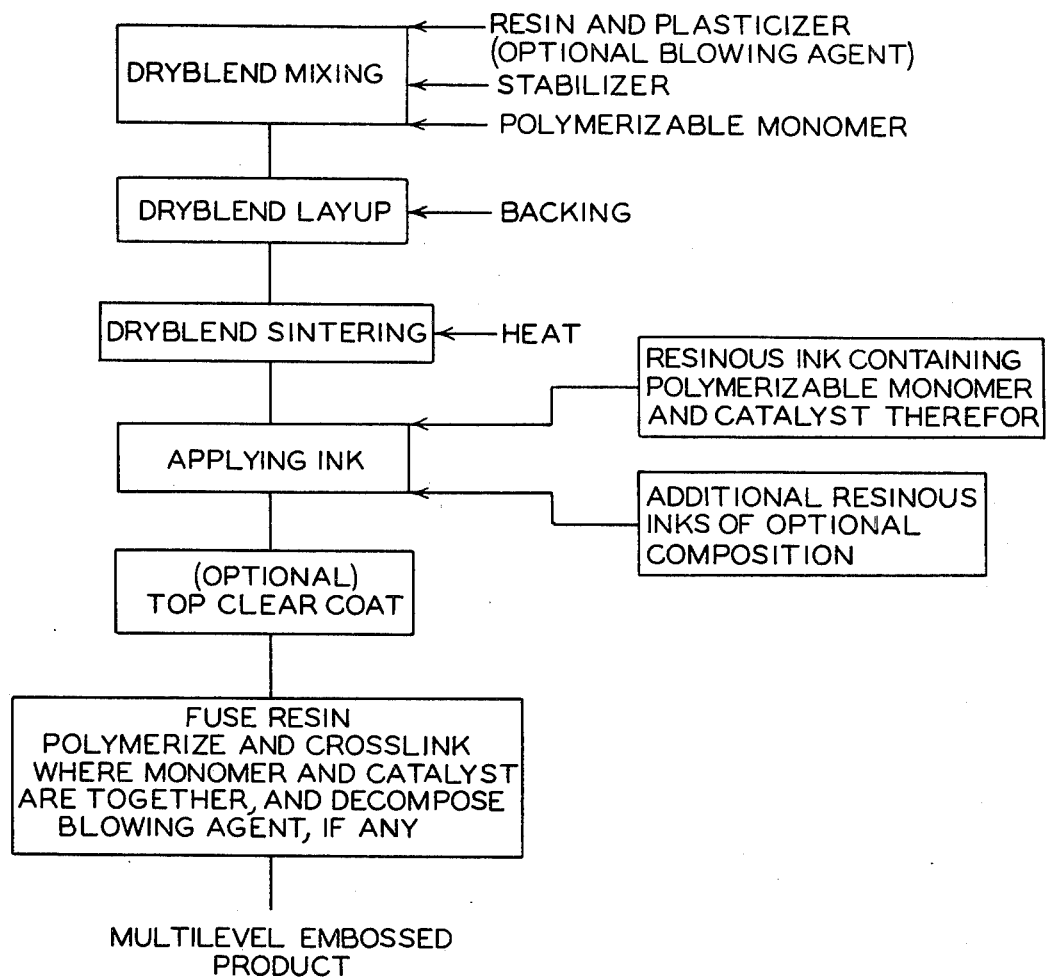
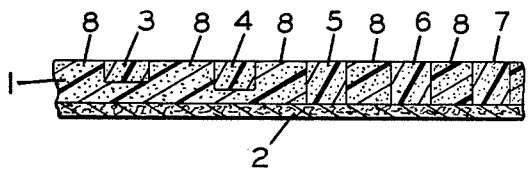
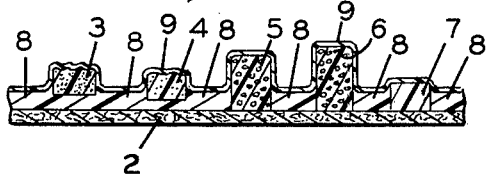
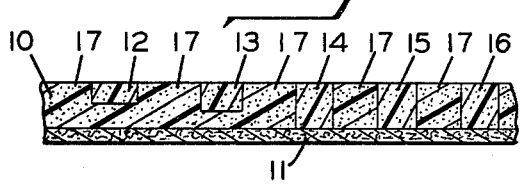
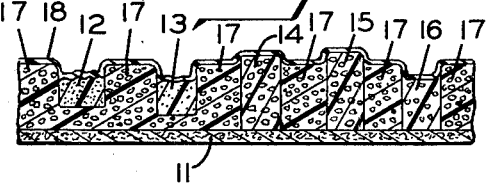

MULTILEVEL EMBOSSING BY PRINTING WITH A REACTIVE MONOMER

CROSS-REFERENCE TO RELATED APPLICATION

This is a continuation-in-part of application Ser. No. 272,851, filed July 18, 1972, in the name of Jack H. Witman now abandoned.

BACKGROUND OF THE INVENTION

1. Field of the Invention

The invention relates to the surface covering arts, and more particularly to floor coverings, wall coverings, and the like. The invention produces sharply etched embossed textured and untextured designs in such surface coverings and represents a step forward in the constant search to achieve new, eye-appealing effects.

2. Description of the Prior Art

In U.S. Pat. No. 3,365,353-Witman, a polymerizable monomer is included in a foamable plastisol which is deposited as a wet film and heated to gel the film without decomposition of the blowing agent. A printing ink applied to the gelled plastisol layer contains a polymerization catalyst which brings about polymerization of the polymerizable monomer in those areas to which the catalyst is applied. On subsequent heating, the polymerized and cross-linked monomer restricts expansion of the foam in those areas and produces an embossed appearance.

In U.S. Pat. No. 592,186-Bedford et al (issued Oct. 19, 1897), a porous linoleum composition is laid up on a backing, and colored paints are then printed on the porous surface to produce through-pattern effects. Heat and pressure are used both to place the porous composition in printable condition and to cure and consolidate the final product.

In U.S. Pat. No. 3,359,352-Powell et al, a porous layer of dryblend may be printed with a variety of inks to produce through-pattern effects. Heat and pressure may be used as appropriate. Foaming inks may be used if desired.

U.S. Pat. No. 3,538,204-Grubb et al discloses printing on a gelled foamable plastisol with a hardening agent suitable for cross-linking the vinyl chloride resin in the plastisol.

SUMMARY OF THE INVENTION

The dryblend to be used in the present invention is formed by known methods of blending vinyl chloride resin particles such as poly(vinyl chloride) or vinyl chloride-vinyl acetate copolymers in a mixer with suitable quantities of plasticizers, stabilizers, blowing agents if desired, and, in the case of the present invention, polymerizable monomer having at least two olefinically unsaturated sites. The mixing is normally carried out at elevated temperatures insufficient to cause fusion of the resin and/or decomposition of the blowing agent if one is included. The resulting dryblend is a free-flowing powder. This dryblend is deposited in a layer having a thickness in the range of 0.005–0.080 inch on a backing. The backing may be a permanent backing or a release backing from which the finished resinous system can be stripped after the completion of the process. A layer of the dryblend is subjected to heat at a temperature below the decomposition temperature of any blowing agent which may be included therein to cause sintering of the resin particles by slight fushion at the points of contact between particles. At this stage there is no fusion in the usual sense in which the plasticizer is totally absorbed in the resin particles which then blend to form a tough, homogeneous, flexible, strong film. The sintered layer is porous and has voids distributed from the surface throughout the entire interior of the sintered layer. Foamable and non-foamable non-monomer-containing ink compositions are then applied in a design to the sintered layer. These ink compositions contain a resin, preferably a vinyl chloride resin. At least one of the inks contains a blowing agent, and at least one contains a blowing agent and an accelerator therefor. Additionally, a vinyl chloride resin ink composition containing the same polymerizable monomer used in the dryblend together with a polymerization catalyst to bring about polymerization of the monomer, is printed in a design on the sintered dryblend layer. A similar ink composition without the monomer but containing the catalyst may also be used. The latter two ink compositions result in improved, different degrees of texturing and elevation in the final product. To achieve the purposes of the invention, the monomer and/or catalyst-containing ink compositions should penetrate at least 2 mils of the thickness of the sintered dryblend. The entire system is then subjected to sufficient heat to cause complete fusion of all resins, cause polymerization and cross-linking of the polymerizable monomer and decompose any blowing agent if included. In the embodiment wherein a non-foamable dryblend is used, the areas printed with the monomer and/or catalyst-containing ink compositions will stand substantially higher than the areas where no ink has been applied and will have a different, rougher surface texture. The voids in the printed areas have been filled with the ink and have been stiffened and toughened by polymerization and crosslinking of the monomer. The unprinted areas shrink in thickness as hot resins flow and fill the voids originally present in the sintered dryblend. Areas of the dryblend which were printed with the non-monomer-containing foamable inks will, of course, be highest in elevation, while areas printed with the regular non-foamable inks will be intermediate in height between the height of the unprinted areas and the areas printed with the ink containing the catalyst for the monomer in the dryblend. In the improvement of this invention, the purpose of having the polymerizable monomer both in the dryblend and in the ink printed on the sintered dryblend is to obtain a larger concentration of the polymerizable monomer in the areas printed therewith than would otherwise be reasonably possible by having monomer in the dryblend alone or the ink alone. On polymerization and crosslinking, this relatively large amount of monomer forms an unusually tough, strong, rough, textured region, unusually wear resistant under heavy foot traffic. A top wear-resistant clear coat may be applied over the entire system, if desired, either before or after the final heating step.

BRIEF DESCRIPTION OF THE DRAWING

FIG. 1 is a flow diagram illustrating the process of the present invention,

FIG. 2 is an enlarged, simplified section of the non-foamable printed dryblend product before fusion, FIG. 3 is an enlarged, simplified section of the product of FIG. 1 after final fusion and having a top clear coat, FIG. 4 is an enlarged, simplified section of the foamable printed dryblend product before fusion and foaming, and FIG. 5 is an enlarged, simplified section of the product of FIG. 3 after final fusion and having a top clear coat.

DESCRIPTION OF THE PREFERRED EMBODIMENTS

The flow diagram of FIG. 1 of the drawings sets forth the steps involved in making the improved multi-level embossed sheet of this invention.

To make the dryblend, the resin granules are placed in a mixer. Poly(vinyl chloride) is the resin of choice. A typical poly(vinyl chloride) resin for dryblending would have a particle size ranging from about 0.003 inch to 0.015 inch. If a foamable dryblend is desired, a blowing agent may be added. The preferred blowing agent for poly(vinyl chloride) is azobisfoamamide. Plasticizer is slowly added to the tumbled mass of poly(vinyl chloride) resin, allowing heat buildup to about 180°–220° F. The heat is sufficient to cause absorption of the plasticizer into the surface of the vinyl chloride resin granules without causing fusion or decomposition of blowing agent if included. Some swelling takes place. Stabilizers such as epoxidized oils, metal soap stabilizers, and others well known in the art may be added to prevent heat and light deterioration of the vinyl chloride resin during processing and subsequent use. Plasticizers will be used in the range of about 15 parts by weight to about 90 parts by weight per 100 parts by weight of the resin. Stabilizers are used in the amount of about one-half to 5 parts by weight per 100 parts by weight of the resin. The blowing agent will normally be present in an amount in the range of about 0.5%–15% based on the weight of the thermoplastic resin.

For the purposes of the preferred embodiment of the present invention, there must also be incorporated into the dryblend a polymerizable monomer having at least two olefinically unsaturated sites. Such monomers may be the di- and triacrylates and dimethacrylates and trimethylacrylates prepared by the esterification of glycols with acrylic acid and methacrylic acid. Trimethylol propane trimethacrylate is preferred. Monoacrylates and methacrylates are usable where the esterifying portion of the alcohol itself contains an olefinically unsaturated bond as is the case in allyl acrylates. Dicarboxylic acids may be esterified with unsaturated alcohol to produce such usable monomers as diallyl fumarate. Diolefinically unsaturated hydrocarbons such as divinyl benzene, divinyl toluene, and the like also function to polymerize and to cross-link in the present process. All of these polymerizable monomers are those which readily polymerize and cross-link at elevated temperatures under the influence of polymerization catalysts as described in aforesaid U.S. Pat. No. 3,365,353-Witman, the disclosure of which is hereby incorporated herein by reference.

In making the dryblend containing the polymerizable monomer, the monomer will simply be treated as if it were a vinyl chloride resin plasticizer. Accordingly, actual replacement of the usual plasticizers on a weight basis with the polymerizable monomer will normally be best. The polymerizable monomer will simply be added to the dryblend in the mixer during warming in the usual way. Amounts of polymerizable monomer will generally be in the range of about 5%–30% by weight of the final dryblend composition.

The dryblend composition is a free-flowing powder reminiscent of dry sand. It will be laid up on the backing in a thickness in the range of about 0.005–0.080 inch. Methods of lay-up, such as doctoring, are well known in the art.

A backing or strippable carrier will serve as a substrate on which to lay up the dryblend. Backings are well known in the surface covering art and may be, for example, a felt, preferably a rubber-bonded asbestos felt, a cellulosic felt having a rubber or asphalt binder, a vinyl sheet backing, or in fact any flexible material which will support the layer of dryblend. The strippable carrier may be a steel belt, a rubber belt, or a paper or felt having a release coating thereon.

After lay-up, the dryblend will be sintered on the backing in order that the free-flowing powdered dryblend composition will be solidified to a porous, relatively strong layer having a printable surface. The dryblend particles adhere to one another at point-to-point contact by virtue of incipient fusion where the particles touch each other. Such incipient fusion leaves a porous layer having a significant number of voids distributed throughout the thickness of the layer. Approximately 30%–60% of the volume of the sintered dryblend layer will be the voids.

The surface of the sintered dryblend may be rendered as flat as desired by pressing or calendering if such is needed, but generally the surface is sufficiently printable once the layer has been sintered. Generally speaking, sintering temperatures occur in the range of about 250°–400° F. If a foamable dryblend is desired, blowing agents may be added to the mixture while the dryblend is being prepared, along with any desired activators or accelerators as described in the aforementioned U.S. Pat. No. 3,365,353-Witman patent. Pigments and dyes may also be added.

The sintered dryblend layer is then ready for printing. The printing may be carried out with conventional procedures such as screen printing or block printing, or any other method which supplies sufficient of the ink composition to penetrate into the dryblend layer. The ink composition may be sprayed or worked into the sintered surface by hand with brushes, spatulas or other artistic tools used by the artist to create an attractive design. To achieve the improvement in the embossed effect sought by the present invention, the ink composition containing the polymerizable monomer and the catalyst therefor must penetrate at least to a depth of about 2 mils into the thickness of the sintered dryblend layer. Preferably, the ink will penetrate 100% of the thickness of the layer in order that practically the full, original thickness thereof will be maintained in the areas so printed during the subsequent complete fusion step which will cause some shrinkage in all of the other areas of the non-blowing agent containing portions of the sintered dryblend. A region printed with this ink, with a penetration of only 2 mils into the thickness of the sintered dryblend layer will shrink on the subsequent fusion step more than a region where the printed composition penetrates 100% of the thickness. Therefore, by regulating the penetration, different elevations of the embossed areas will be achieved.

The ink composition would normally include a thermoplastic resin binder along with suitable pigments, dyes and stabilizers. Critical to the preferred embodiment of the present invention is the presence of polymerizable monomer of the sort described earlier in connection with the dryblend. The same polymerizable monomer will be used in the ink composition as is used in the dryblend. By same polymerizable monomer is meant one having the same descriptive properties of having at least two olefinically unsaturated sites, and most often the monomer in the dryblend and ink composition will be chemically identical. However, such chemical identity is not critical in that a diacrylate may be used in the dryblend and a triacrylate may be used in the ink should such be considered desirable. Poly(vinyl chloride) is the resin of choice for the ink binder, although the usual vinyl chloride-vinyl acetate copolymers may be used, as may other thermoplastic resins which will form on the subsequent application of heat a tough, strong, flexible region throughout the sintered dryblend layer. The ink composition will also include a polymerization catalyst for the polymerizable monomer. These catalysts are the known free radical catalysts and comprise mostly the organic per-compounds. Among the peroxides that are usable are di-t-butyl peroxide, benzoyl peroxide, lauroyl peroxide, capryloyl peroxide, acetyl peroxide, p-chlorobenzoyl peroxide, cumene hydroperoxide, diacetone peroxide, and others. Other per-compounds such as t-butyl perbenzoate and isopropylpercarbonate may also be used. Other free radical initiators such as alpha,alpha'-azodiisobutyronitrile and other such aliphatic azo catalysts may be used. The polymerizable monomer will generally be present in the ink composition in the amount of 5%–50% by weight based on the total weight of the composition. Catalysts will usually be present in an amount of about 0.25% to about 5% by weight based on the total weight of the system. Since this ink composition will normally be applied by printing methods, the ink will be prepared on standard ink mills or rolls by known methods. Viscosity depressants may be used, as may be thickeners or all the other range of additives customarily used in controlling the properties of inks and paints.

The designs to be used in applying the ink to the sintered dryblend are limited only by the imagination of the designer. Varities of colors and shapes and representations may be used. As previously described, other inks not containing any polymerizable monomer may be used in areas not printed with the ink composition containing the polymerizable monomer, to produce regions having different elevations from those produced by use of the ink compositions containing the monomer. Depending on the needs of the designer, the entire surface of the sintered dryblend may be printed; only one of the inks need contain the polymerizable monomer and the catalyst. Alternatively, certain areas may be printed with the ink compositions containing the polymerizable monomer and catalyst while no printing at all would be utilized elsewhere. Application of the inks to the sintered dryblend layer is readily carried out by methods known in the art in widths up to 12 or more feet wide for use in the floor covering industry.

FIG. 2 of the drawings illustrates a simplified, enlarged cross-section of a non-foamable printed dryblend product before fusion, wherein a sintered layer of non-foamable dryblend 1 containing a polymerizable monomer is laid up on a backing 2, and then printed with a plurality of resinous inks to create design areas 3, 4, 5, 6 and 7 interspersed with non-printed areas 8. The number and types of inks used here will be understood as being by way of example and not limiting. Inked areas 3 and 4 are shown as extending only partially through the thickness of the sintered dryblend layer 1, while printed areas 5, 6 and 7 extend completely through the thickness of the layer to demonstrate that the depth of penetration of the inks into the dryblend layer may be regulated as desired. Formulations of the ink compositions may also be varied to achieve the elevations and surface textures desired on the embossed surface of the sheet. As previously stated, however, critical to the improvement of this invention is that at least one of the inks used to print the sintered dryblend layer must be a resinous ink composition including a polymerizable monomer and a polymerization catalyst therefor. One such inked area is indicated by the numeral 3 in FIG. 2. Numeral 4 indicates an inked area wherein a resinous ink containing a catalyst for the monomer in the dryblend has been applied to the dryblend layer and has partially penetrated through the thickness thereof. The ink used in the printed area 4 provides a different, intermediate degree of toughness and stiffening, and a different surface texture and elevation to this area than that produced by the ink used in inked area 3 and other inked areas. Numerals 5, 6 and 7 indicate respectively the use of resinous inks containing a blowing agent, a blowing agent and an accelerator therefor, and a regular thermoplastic resinous ink of known composition.

FIG. 3 illustrates an enlarged cross-section of the product formed after application of a clear top coat 9 and final heating to fuse the resin, polymerize and cross-link the monomer where the monomer and catalyst are together, and decompose the blowing agent. As shown in FIG. 3, printed area 3 retains approximately its original height and has a roughened surface texture for the reasons previously explained. Printed area 4 is reduced somewhat in elevation and roughness of the surface texture; foamed, printed area 5, as shown, is higher in elevation than areas 3 and 4; foamed, printed area 6 is highest in elevation; and unprinted areas 8 have shrunken to the lowest elevation due to flow of the resin filling the voids previously present in the sintered dryblend layer 1.

Another embodiment of the present invention is illustrated by FIG. 4 of the drawings wherein an enlarged cross-section of a foamable, printed dryblend product before fusion is shown. In this embodiment a foamable dryblend layer 10 containing a polymerizable monomer is formed on the backing 11, and printed to create design areas 12, 13, 14, 15 and 16 interspersed with non-printed areas 17, in the manner previously described, and with the same inks having similar degrees of penetration as those used in printing the unfused product shown in FIG. 2.

FIG. 5 shows an enlarged cross-section of the product shown in FIG. 4 with a clear top coat 18 and after the final heating step to fuse the resin, polymerize and cross-link the monomer and decompose the blowing agent. In this embodiment, results are obtained in the inked areas 12, 13, 14, 15 and 16 strikingly similar to those obtained with respect to the inked aeas in the product shown in FIG. 3. However, in the non-inked areas 17, the foamable dryblend rises to an elevation higher than inked areas 12, 13 and 16, while areas 14 and 15 (printed with foamable inks) may rise above the unprinted areas, thus creating a multilevel embossed pattern with a difference in surface textures.

In most instances, it will be desired to coat the entire printed surface of the sintered dryblend with a top clear coat to serve as a wear-resistant layer. These clear coats will normally be a plastisol or organosol with little or no filler therein and may be printed, sprayed, doctored or roll applied over the entire sheet in known manner.

Gloss can be controlled with a flattening agent. Such clear coats are normally applied in a thickness sufficient to give a final fused film thickness in the range of about 0.001-0.015 inch. A preformed clear coat film could be laid over the printed, sintered dryblend if desirable.

The final heating and fusion step will be carried out preferably in a hot air oven through which the backing or carrier will transport the entire resinous system. Final fusion of the resin system and blowing agent decomposition temperature will generally be in the range of 350°-450° F. Such temperatures will cause the catalytic polymerization of monomer in the areas printed with the ink composition described above. The catalyst in the ink will polymerize both the monomer in the ink and the monomer in the dryblend in those printed regions. By virtue of having the monomer present both in the dryblend and in the ink composition, relatively large amounts of monomer can readily be obtained in the printed areas resulting in a tougher, stronger, more shrink-resistant area than would be obtainable if the monomer were in the dryblend alone or in the ink alone. Since these polymerizable monomers all serve as solvents or plasticizers for vinyl resins, there is a limit as to how much of the monomer can be blended with the vinyl resin in any one system, such as an ink system or a dryblend system.

In addition to causing catalytic polymerization and crosslinking of the polymerizable monomer in the ink and dryblend in the portions printed with the catalyst-containing ink, the final fusion step will cause complete fusion of the sintered non-foamable dryblend, converting the porous dryblend layer to a non-porous layer having a thickness substantially less than the original of the sintered, porous dryblend layer.

In addition to converting the described resinous system into a tough, strong, decorative surface covering having an embossed appearance, the final fusion step will also convert any top clear coat to a tough, clear, wear-resistant film which will serve to protect the decorative resinous systems in use, if such protection is needed. Where the products of the present invention are to be used as floor coverings, a clear coat will almost always be used.

The following examples illustrate several embodiments of the invention. All parts are by weight unless otherwise stated.

EXAMPLE 1

The following dryblend was prepared:

| Ingredients | Parts |
|---|---|
| Poly(vinyl chloride) | 100 |
| Dioctyl phthalate | 25 |
| Trimethylol propane trimethacrylate | 15 |
| Epoxidized soya bean oil | 5 |
| Ba-Cd-Zn soap stabilizers | 5 |
| Pigment - $TiO_2$ | 2.2 |
| Limestone | 10.0 |
| | 162.2 |

A layer of this dryblend, approximately 55 mils thick, was deposited on a release-coated, beater saturated asbestos backing, and the system was sintered for 1.8 minutes at 380° F.

The sheet was printed with the following plastisol inks:

| | 1 | 2 | 3 | 4 | 5 |
|---|---|---|---|---|---|
| Poly(vinyl chloride) resin | 100 | 100 | 100 | 100 | 100 |
| Dioctyl phthalate | 38 | 38 | 25 | 20 | 25 |
| Butyl benzyl phthalate | 8 | 8 | — | — | — |
| Epoxidized soya bean oil | 5 | 5 | — | 5 | — |
| Zn blowing agent catalyst | 3 | — | — | — | — |
| Azobisformamide | 10 | 10 | — | — | — |
| Trimethylol propane trimethacrylate | — | — | — | 20 | — |
| 2,2,4-trimethyl-1,3 pentane diol di-isobutyrate | — | — | 17 | 3 | 17 |
| Pigment yellow | 4 | 2 | — | 0.74 | — |
| Pigment white | — | 5 | — | 8.60 | — |
| Pigment orange | — | — | — | 2.22 | — |
| Benzoyl peroxide/dibutyl phthalate, 60/40 | — | — | — | 5.05 | 7 |
| Dibutyl tin maleate | — | — | 2 | — | 2 |
| Pigment brown | — | — | 4 | — | — |
| Pigment red | — | — | — | — | 4 |

This printed sheet was fused in a 500° F. oven, 55 seconds. The fused sheet showed the foamable ink No. 1 area to be substantially thicker than the restricted area, for example ink No. 4, and the regular plastisol ink (No. 3) printed area was in the lowest elevation and smooth. Areas of the sheet printed with inks Nos. 4 and 5 resulted in textured surface portions having different degrees of roughness and elevation.

EXAMPLE 2

A foamable dryblend was made by blending the following ingredients:

| Ingredients | Parts |
|---|---|
| Poly(vinyl chloride) | 100 |
| Dioctyl phthalate | 58 |
| Epoxidized soya bean oil | 5 |
| Calcium, zinc soap stabilizer | 4 |
| Silica | 0.7 |
| Limestone | 10 |
| Titanium dioxide | 4 |
| Trimethylol propane trimethacrylate | 12 |
| Azobisformamide | 2.2 |

A layer of this dryblend about 55 mils thick was applied to a release-coated beater saturated asbestos backing, and the system was sintered for 1.3 minutes at 380° F. The sintered thickness was about 40 mils.

A clear printing ink was made of the following formula:

| Ingredients | Parts |
|---|---|
| Poly(vinyl chloride) resins | 100 |
| Dioctyl phthalate | 10 |
| Epoxidized soya bean oil | 8.3 |
| 2,2,4-trimethyl-1,3 pentane diol di-isobutyrate | 5 |
| Benzoyl peroxide/dibutyl phthalate, 60/40 | 2.5 |
| Trimethylol propane trimethacrylate | 35 |

A design was screen printed on the sintered dryblend using sufficient ink to penetrate 100% of the thickness of the porous dryblend. The system was then fused in an air impingement oven for 1 minute at 450° F. A tough, strong, cellular, flexible sheet resulted having pronounced embossing in the printed areas, all of which were lower than adjacent, unprinted areas.

What is claimed is:

1. A decorative surface covering comprising a base layer of fused, dryblend containing polymerized monomer therein, a plurality of fused ink-containing regions at least one of which extends upwardly from within said base layer to a point of elevation above the surface thereof, at least one of said ink-containing regions containing said monomer in cross-linked condition in both the ink and the dryblend, and at least one of the remainder of said plurality of ink-containing regions being free of said cross-linked monomer, whereby embossed wear surface areas are achieved which differ in elevation and surface texture.

2. The decorative surface covering of claim 1 including a clear resinous coating over the top surface thereof.

3. A decorative surface covering according to claim 1, wherein the base layer of fused dryblend is foamed, at least one of said ink-containing regions containing said monomer in cross-linked condition in both the ink and in the dryblend is of lesser thickness than said foamed base layer, and wherein at least one of the remainder of said plurality of ink-containing regions free of said cross-linked monomer is of a different thickness than said monomer-containing inked regions.

4. The decorative surface covering of claim 3 including a clear resinous coating on the top surface thereof.

5. In the process for producing a decorative surface covering having a multilevel embossed wear surface comprising
forming a dryblend composition comprising vinyl chloride resin particles, plasticizer, and a polymerizable monomer having at least two olefinically unsaturated sites,
forming a layer of said dryblend having a thickness in the range of about 0.005–0.080 inch,
heating said layer to sinter the dryblend without fusion and to form a porous, open layer,
forming design areas on at least a portion of said dryblend layer by applying thermoplastic resinous ink thereto in an amount sufficient to cause penetration thereof into the dryblend to a depth of at least 2 mils at the points of application, and finally heating to fuse all thermoplastic resins,
the improvement comprising forming said design areas by applying a plurality of thermoplastic resinous inks of different compositions, at least one of said thermoplastic inks containing a polymerizable monomer having at least two olefinically unsaturated sites, and a polymerization catalyst therefor, and at least one ink having a composition free of both monomer and catalyst, said final heating step causing polymerization and cross-linking of the monomer in the monomer-containing ink and in the dryblend in the areas to which it was applied, whereby embossed design areas are achieved on the final product which produce different embossed effects.

6. The process according to claim 5 wherein at least one of said ink compositions contains a polymerization catalyst and is free of monomer.

7. The process according to claim 5 wherein the polymerization catalyst is benzoyl peroxide.

8. The process according to claim 5 wherein at least one of said ink compositions penetrates 100% of the thickness of said dryblend layer.

9. The process according to claim 5 wherein said polymerizable monomer in the dryblend and in the ink is trimethylol propane trimethacrylate.

10. The process according to claim 5 wherein the vinyl chloride resin particles comprise poly(vinyl chloride).

11. The process according to claim 5 wherein the dryblend composition includes a blowing agent.

12. The process according to claim 11 wherein the blowing agent is azobisformamide.

13. The process according to claim 5 wherein the resin in said ink compositions comprises poly(vinyl chloride).

14. The process according to claim 5 wherein at least one of said ink compositions not containing the polymerizable monomer includes a blowing agent.

15. The process according to claim 14 wherein the blowing agent is azobisformamide.

16. The process according to claim 3 wherein the ink composition contains an accelerator for the blowing agent.

17. The process according to claim 5 wherein a clear coat composition is applied over said printed, sintered dryblend layer prior to the final heating step.

* * * * *

UNITED STATES PATENT OFFICE
CERTIFICATE OF CORRECTION

PATENT NO. : 4,068,030
DATED : January 10, 1978
INVENTOR(S) : Jack H. Witman

It is certified that error appears in the above-identified patent and that said Letters Patent are hereby corrected as shown below:

Column 7, line 1, the word "flattening" should read --flatting--.

Column 10, line 36, claim 16, the words "claim 3" should read --claim 14--.

Signed and Sealed this

Second Day of May 1978

[SEAL]

Attest:

RUTH C. MASON
Attesting Officer

LUTRELLE F. PARKER
Acting Commissioner of Patents and Trademarks